US009860085B1

(12) United States Patent
Pettijohn et al.

(10) Patent No.: US 9,860,085 B1
(45) Date of Patent: Jan. 2, 2018

(54) SIGNAL ESTIMATOR

(71) Applicant: LOCKHEED MARTIN CORPORATION, Bethesda, MD (US)

(72) Inventors: Billy D. Pettijohn, Mountain View, CA (US); Erik Jan Paulley, San Jose, CA (US); MacDaniel J. Radigan, Chandler, AZ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/490,831

(22) Filed: Apr. 18, 2017

Related U.S. Application Data

(60) Provisional application No. 62/325,905, filed on Apr. 21, 2016.

(51) Int. Cl.
| | | |
|---|---|---|
| H04L 25/02 | (2006.01) | |
| H04B 7/04 | (2017.01) | |
| H04L 29/06 | (2006.01) | |

(52) U.S. Cl.
CPC ......... *H04L 25/025* (2013.01); *H04B 7/0482* (2013.01); *H04L 65/608* (2013.01)

(58) Field of Classification Search
CPC .............. H04L 25/025; H04L 25/0252; H04L 25/0256; H04L 25/03636; H04L 25/03668; H04L 65/608; H04B 7/0482

USPC .................................................. 375/316, 344
See application file for complete search history.

(56) References Cited

U.S. PATENT DOCUMENTS

| | | | |
|---|---|---|---|
| 5,272,446 A | 12/1993 | Chalmers et al. | |
| 6,404,760 B1 | 6/2002 | Holtzman et al. | |
| 9,094,107 B1* | 7/2015 | Kumar | H04L 27/103 |
| 2012/0140806 A1* | 6/2012 | Turner | H02P 23/14 |
| | | | 375/224 |
| 2015/0285905 A1* | 10/2015 | Eldar | G01S 7/2923 |
| | | | 342/196 |

\* cited by examiner

*Primary Examiner* — Siu Lee
(74) *Attorney, Agent, or Firm* — McDermott Will & Emery LLP

(57) ABSTRACT

A Least Mean Squares (LMS) polynomial estimator is disclosed. The LMS polynomial estimator may be a LMS moving window polynomial estimator capable of performing real-time polynomial estimation and evaluation of successive time derivatives of a function of a single variable up to a specified polynomial order. The estimator makes a unique use system memory that allows for the evaluation of the least squares normal equations with a very low computational footprint. This allows the estimator to be realizable in computationally-constrained environments such as embedded systems. The LMS polynomial estimator may be implemented in a frequency estimator for estimation of the phase, frequency, Doppler, delta Doppler, and/or higher order time derivatives of phase. Estimates may be performed in real time, running at the same rate as the inbound signal.

20 Claims, 9 Drawing Sheets

SIGNAL ESTIMATOR

CROSS-REFERENCES TO RELATED APPLICATIONS

The present application claims the benefit of priority under 35 U.S.C. §119 from U.S. Provisional Patent Application Ser. No. 62/325,905 entitled "LEAST MEAN SQUARED (LMS) FREQUENCY ESTIMATOR AND GENERAL LEAST MEAN SQUARED POLYNOMIAL ESTIMATOR, LOW COMPUTATION, HIGH ACCURACY," filed Apr. 21, 2016, the disclosure of which is hereby incorporated by reference in its entirety for all purposes.

STATEMENT REGARDING FEDERALLY SPONSORED RESEARCH OR DEVELOPMENT

Not applicable.

FIELD

The present disclosure relates in general to signal attribute estimators, and in particular to, for example, without limitation, a least mean squares (LMS) phase, frequency, Doppler and Delta Doppler parameters estimator which includes an LMS polynomial estimator.

BACKGROUND

Conventional LMS parameter estimators are typically based on a brute-force matrix multiplication that is not suitable for real-time signal estimation because of the number of computations required. In particular, in conventional signal estimators, the estimation grows with the number of signal samples input to the estimator. For many signal estimation applications, thousands, hundreds of thousands, or millions of samples are used and thus the number of computations required is too computationally expensive for efficient real-time applications.

SUMMARY

In accordance with some aspects of the subject disclosure, a computer-implemented frequency estimator is provided that includes a LMS polynomial estimator configured to receive an electronic input signal. The polynomial estimator includes a chain of weighted accumulators configured to successively accumulate samples associated with the electronic input signal, in a nonlinear fashion. The polynomial estimator also includes memory storing a direct estimator matrix, the direct estimator matrix including elements that are based on a factorization of the input accumulation vector so as to map the input accumulation vector to the desired accumulation vectors. Also incorporated into the direct estimator matrix are the pseudo-inverse of the Vandermonde matrix, the time scaling matrix, and the integer scaling matrix. The polynomial estimator also includes a matrix multiplier configured to multiply an output vector from the chain of accumulators by the stored factorization matrix, and generate an estimate of a phase, frequency, Doppler and Delta Doppler of the electronic input signal based on the multiplication.

In accordance with some aspects of the subject disclosure, a computing device is provided that includes a LMS polynomial estimator. The polynomial estimator includes a chain of accumulators configured to successively accumulate samples of an input function. The polynomial estimator also includes memory storing a direct estimator matrix, the direct estimator matrix including elements that are based on a factorization of the least squares normal equation in solving for coefficients when modelled by a Vandermonde matrix. The polynomial estimator also includes a matrix multiplier configured to multiply an output vector from the chain of accumulators by the stored factorization matrix, and generate at least one estimated time derivative of the input function based on the multiplication.

In accordance with some aspects of the subject disclosure, a computer-implemented method is provided that includes receiving an electronic input signal and successively accumulating samples associated with the electronic input signal in a chain of accumulators. The method also includes storing a direct estimator matrix, the direct estimator matrix including elements that are based on a factorization of the least squares normal equation in solving for coefficients when modelled by a Vandermonde matrix. The method also includes multiplying an output vector from the chain of accumulators by the stored factorization matrix. The method also includes generating an estimate of a phase, frequency, Doppler, and delta Doppler of the electronic input signal based on the multiplication.

In accordance with some aspects of the subject disclosure, a computer-implemented frequency estimator is provided that includes a least mean squares (LMS) polynomial estimator configured to receive an electronic input signal. The LMS polynomial estimator includes a chain of weighted accumulators configured to non-linearly and successively accumulate samples associated with the electronic input signal. The LMS polynomial estimator also includes memory storing a direct estimator matrix that is based on a product of a mapping matrix for the chain of weighted accumulators and a pseudo-inverse of a geometric progression matrix. The LMS polynomial estimator also includes a matrix multiplier configured to multiply an output vector from the chain of weighted accumulators by the stored direct estimator matrix and to generate an estimate of a frequency of the electronic input signal based on the multiplication.

In accordance with some aspects of the subject disclosure, a computing device is provided that includes a least mean squares (LMS) polynomial estimator. The LMS polynomial estimator includes a chain of weighted accumulators configured to non-linearly and successively accumulate samples of an input function. The LMS polynomial estimator also includes memory storing a direct estimator matrix that is based on a product of a mapping matrix for the chain of weighted accumulators and a pseudo-inverse of a geometric progression matrix. The LMS polynomial estimator also includes a matrix multiplier configured to multiply an output vector from the chain of weighted accumulators by the stored direct estimator matrix and to generate at least one estimated time derivative of the input function based on the multiplication.

In accordance with some aspects of the subject disclosure, a computer-implemented method is provided that includes receiving an electronic input signal and successively accumulating samples associated with the electronic input signal in a chain of weighted accumulators. The method also includes storing a direct estimator matrix that is based on a product of a mapping matrix for the chain of weighted accumulators and a pseudo-inverse of a geometric progression matrix. The method also includes multiplying an output vector from the chain of weighted accumulators by the stored direct estimator matrix. The method also includes generating an estimate of a frequency of the electronic input signal based on the multiplication.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The detailed description set forth below is intended as a description of various configurations of the subject technology and is not intended to represent the only configurations in which the subject technology may be practiced. The attached drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

In some aspects of the subject technology, a frequency estimator is provided. The frequency estimator is configured to estimate characteristics of an electronic input signal. The frequency estimator includes a least mean squares (LMS) polynomial estimator that, following phase normalization and differentiation operations by the frequency estimator, performs the characteristic estimation.

The frequency estimator is implemented in a computing device having a system memory and makes a unique use of the system memory state to perform an equivalent of the Least Squares Normal Equation operations. In particular, the frequency estimator incorporates an LMS polynomial estimator based on a factorization of the least squares normal equation in solving for coefficients when modelled by a geometric progression matrix such as a Vandermonde matrix in a way that can be efficiently mapped to a hardware implementation (e.g., a field-programmable gate array (FPGA) implementation).

In contrast with conventional signal estimators in which the number of computations scales with the number of observation samples (e.g., approximately O(n) for n samples), the subject polynomial estimator has constant time complexity (e.g., O(1)). Accordingly, in contrast with conventional polynomial estimators, the number of computations can be reduced by one or several orders of magnitude, thereby improving both the functioning of the computer itself (e.g., an FPGA or a more general computing device into which the polynomial estimator is coded) and providing an improvement to the existing technologies of both general polynomial estimators and frequency estimators.

Although the LMS polynomial estimator is described herein as a portion of a frequency estimator in some examples, it should be understood that this is merely illustrative and the LMS polynomial estimator may be provided as a standalone estimator or may be embedded in other systems for polynomial estimation applications other than frequency estimation.

Figure 1:
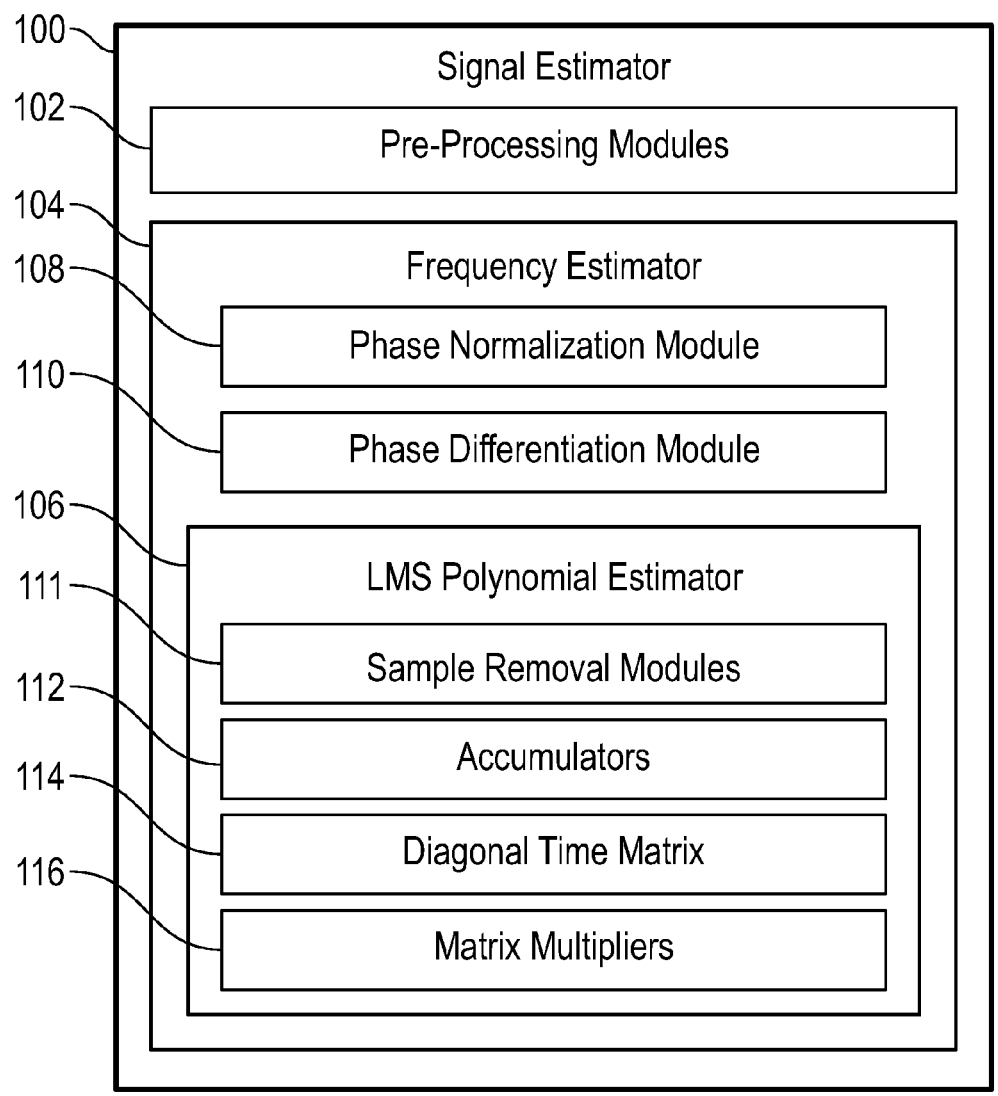
FIG. 1 illustrates an example of a signal estimator according to aspects of the subject disclosure.

FIG. 1 shows an exemplary implementation of a signal estimator according to various aspects of the subject technology. In the example of FIG. 1, signal estimator 100 includes frequency estimator 104, which incorporates LMS polynomial estimator 106. As shown, polynomial estimator 106 includes accumulators 112, a stored matrix such as direct estimator matrix 114, and matrix multiplier 116. In order to estimate a constant, first order, second order, third order, fourth order, or higher order polynomial coefficients of a polynomial estimation of an input signal, polynomial estimator successively accumulates signal samples, each having a sample time period, in a chain of accumulators 112, and a multiplies (using matrix multiplier 116) a vector of outputs from the chain of accumulators by direct estimator matrix 114.

For real-time implementations, polynomial estimator 106 may be provided with one or more sample removal modules 111. Direct estimator matrix 114 is based on a factorization of the least squares normal equation in solving for coefficients when modelled by a Vandermonde matrix. The factorization may be a factorization into two matrices: (1) a quadratic matrix, and (2) a narrow matrix (vector). Multiplication of the narrow matrix with the inbound signal may be performed using a simple moving window of the inbound signal to facilitate real-time signal estimation. Removal of an oldest sample with sample removal module 111 allows a newest sample to be accumulated, thereby forming a moving window for accumulators 112.

As described in further detail below, the remaining product and quadratic matrix are both small in dimension, and their final product may be computed using only a number of multiplications equal to the order of the polynomial being estimated. In real time, estimation is performed using only a number of multiplications equal to the order of the polynomial at each clock cycle. The order of the polynomial may be independent of the use of multipliers. The number of observation samples may be independent of the use of multipliers.

Figure 2:
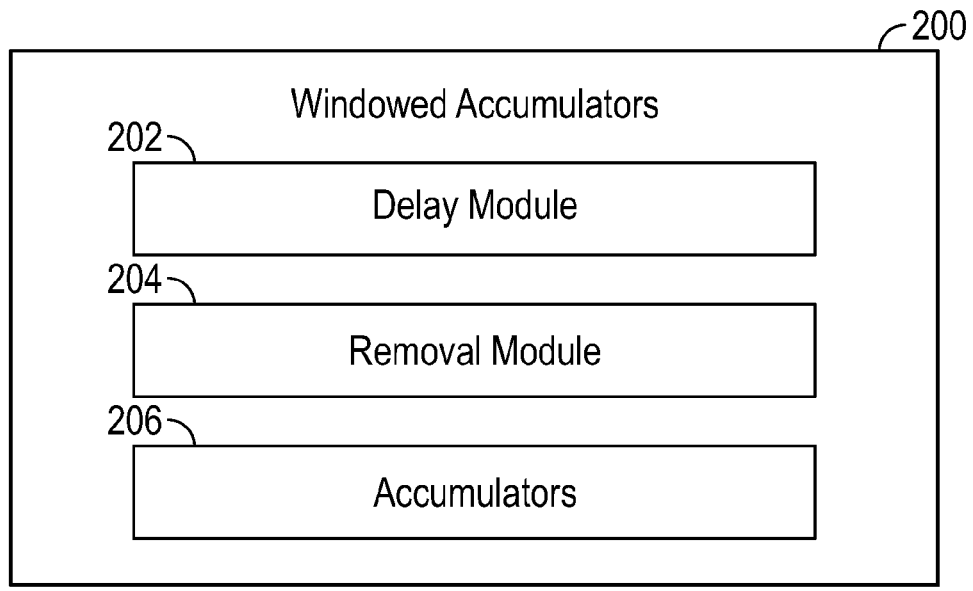
FIG. 2 illustrates an example of windowed accumulators for a signal estimator according to aspects of the subject disclosure.

As shown in FIG. 1, frequency estimator 104 includes phase normalization module 108 and phase differentiation module 110 that perform phase unwrapping operations prior to estimation operations, as described in further detail below. Signal estimator 100 may also include pre-processing modules 102 such as front-end signal processing modules that convert the electronic input signal to a complex baseband signal prior to phase unwrapping operations by frequency estimator 104. In some examples, sample removal modules 111 and accumulators 112 are described in combination as windowed accumulators, particularly for real-time signal estimation operations such as real-time frequency estimation operations. FIG. 2 illustrates example windowed accumulators 200, including sample removal module 111 and accumulators 112, that may be implemented in polynomial estimator 106.

As shown in FIG. 2, sample removal modules 111 of windowed accumulators 200 include delay module 202 and removal module 204. Delay module 202 may be a first-in first-out (FIFO) buffer that buffers an accumulation of a desired number of samples. Removal module 204 may form a differential removal path that removes the oldest accumulated sample to make room for a newest sample as described in further detail hereinafter.

Figure 3:
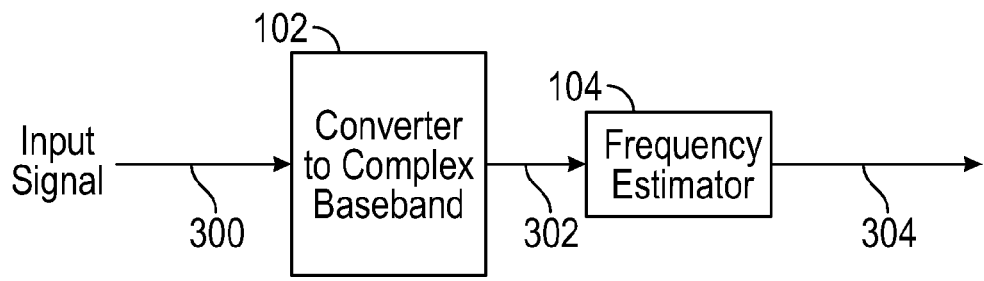
FIG. 3 illustrates an example flow diagram for a signal estimator including a frequency estimator according to aspects of the subject disclosure.

FIG. 3 illustrates a general signal path for signal estimator 100 during signal estimation operations according to some aspects of the subject disclosure. As shown in FIG. 3, an input signal 300 (e.g., an electronic input signal) is provided to pre-processing modules 102 (e.g., a converter to complex baseband). Pre-processing modules 102 generate a converted (complex baseband) signal 302 for frequency estimator 104. Pre-processing modules 102 may consist of front-end logic providing, for example, a 48-bit wrapped phase of the input signal. In one exemplary implementation, pre-processing modules 102 perform a DC bias removal, followed by a quadrature conversion using a quartercycle delay of the fundamental frequency. The quadrature components are then converted to detected phase by the arctangent. This detected phase is given to frequency estimator 104, which provides the instantaneous estimate.

The DC bias removal may be implemented as the difference of the input signal with its moving average. The DC bias removal's low pass filter (LPF) may be implemented using an integrate and dump operation. The summation is reset on the packet edge, resulting in a rectangular window performing a jumping-box-car filter (for example).

Frequency estimator 104 performs frequency estimation operations using polynomial estimator 106 to generate output 304. Output 304 may include an estimated frequency, Doppler, delta Doppler, and/or higher order terms for input signal 300.

Figure 4:
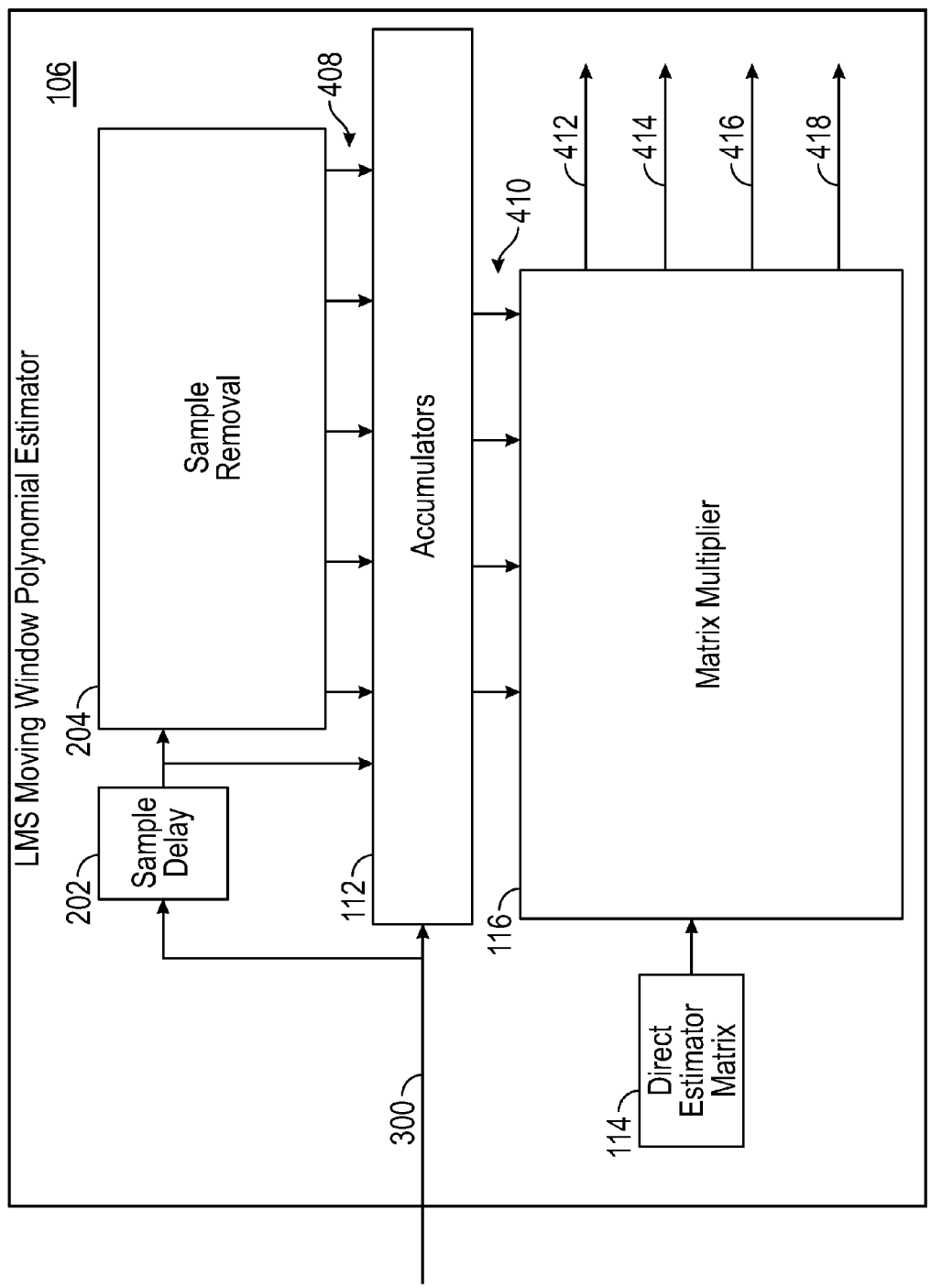
FIG. 4 illustrates an example flow diagram for a LMS polynomial estimator according to aspects of the subject disclosure.

FIG. 4 illustrates a general flow diagram for polynomial estimator 106 during polynomial estimation operations according to some aspects of the subject disclosure. As shown in FIG. 4, input signal 300 may be provided to sample delay module 202 and accumulators 112. Sample delay module 202 may provide delayed samples to both sample removal modules 204 and accumulators 112. Based on the delayed samples from sample delay module 202 and oldest-sample-removal outputs 408 from sample removal modules 204, accumulators 112 may generate a windowed accumulated output vector 410. Output vector 410 may include elements generated by each of one or more accumulators in a successive accumulator chain. Matrix multiplier 116 multiplies output vector 410 from accumulators 112 by direct estimator matrix 114 to generate outputs 412, 414, 416, and 418 (e.g., a constant output, a first order output, a second order output, and/or a third order output). If higher order estimates are desired, additional accumulators can be added to the accumulator chain. It should also be noted that, in some implementations, the removal path including sample delay module 202 and sample removal module 204 may be omitted (e.g., for offline estimation of previously stored signals) in a non-windowed operation.

Figure 5:
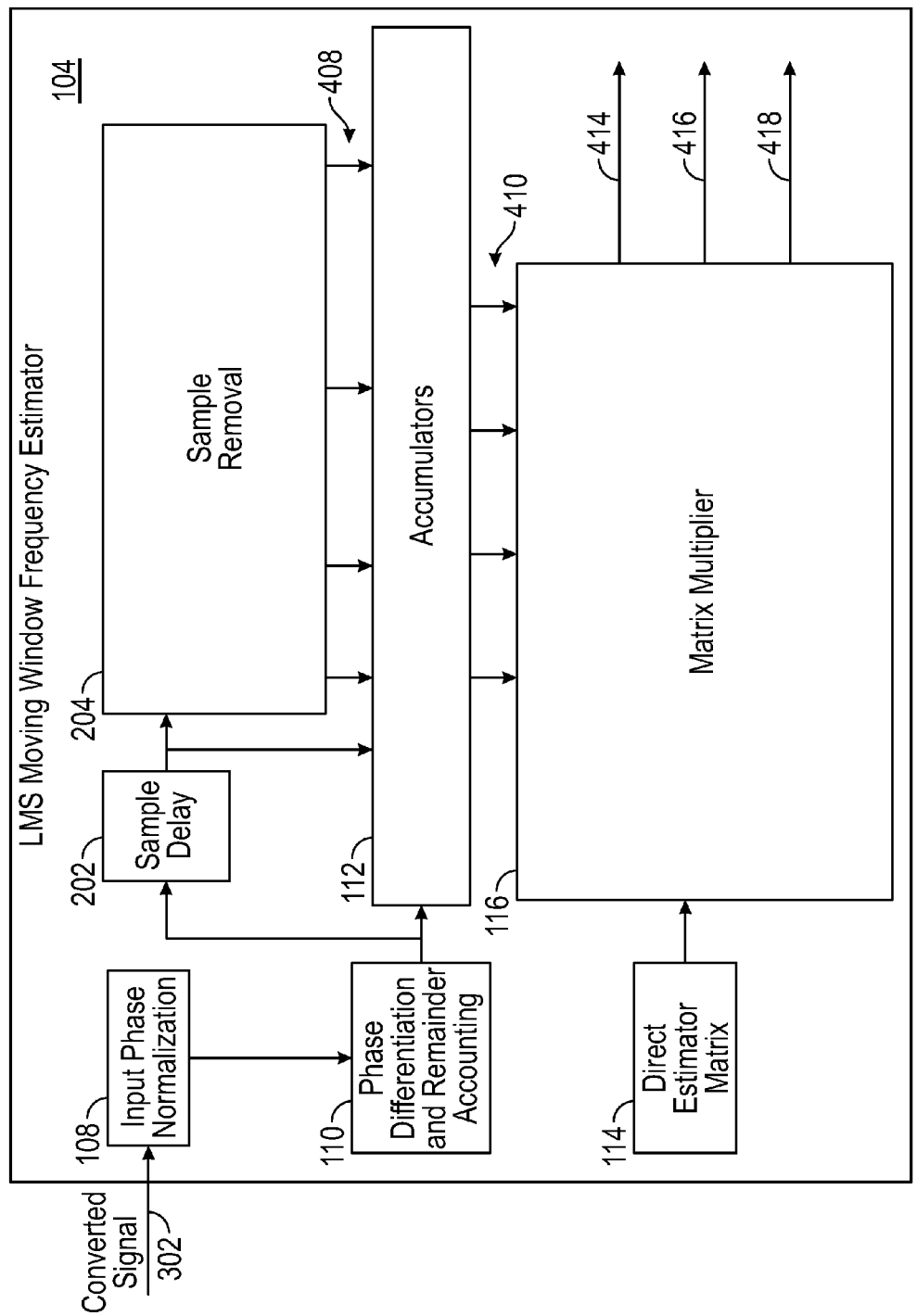
FIG. 5 illustrates an example flow diagram for a frequency estimator according to aspects of the subject disclosure.

As noted above in connection with FIGS. 1 and 2, when polynomial estimator 106 is implemented in a frequency estimator, a phase unwrapping path may be added, before the input signals are provided to the sample removal path and the accumulators. FIG. 5 illustrates a general flow diagram for frequency estimator 104 during frequency estimation operations according to some aspects of the subject disclosure.

As shown in FIG. 5, input phase normalization module 108 may receive converted signal 302 (e.g., from pre-processing modules 102). Input phase normalization module 108 provides a normalized phase signal to phase differentiation and remainder accounting module 110. Phase differentiation module 110 generates (e.g., based on the normalized phase signal) phase unwrapped samples to sample delay module 202 and to accumulators 112.

In the frequency estimator implementation of FIG. 5, rather than outputting a constant term, one of accumulators 112 may be used to reconstruct a windowed phase to be fed forward to the other accumulators in the chain. Accordingly, as shown in FIG. 5, matrix multiplier 116, in a frequency estimator implementation, may output a first order term 414, a second order term 416, and a third order term 418 (e.g., the frequency, Doppler, and delta Doppler) of the input signal.

Figure 6A:
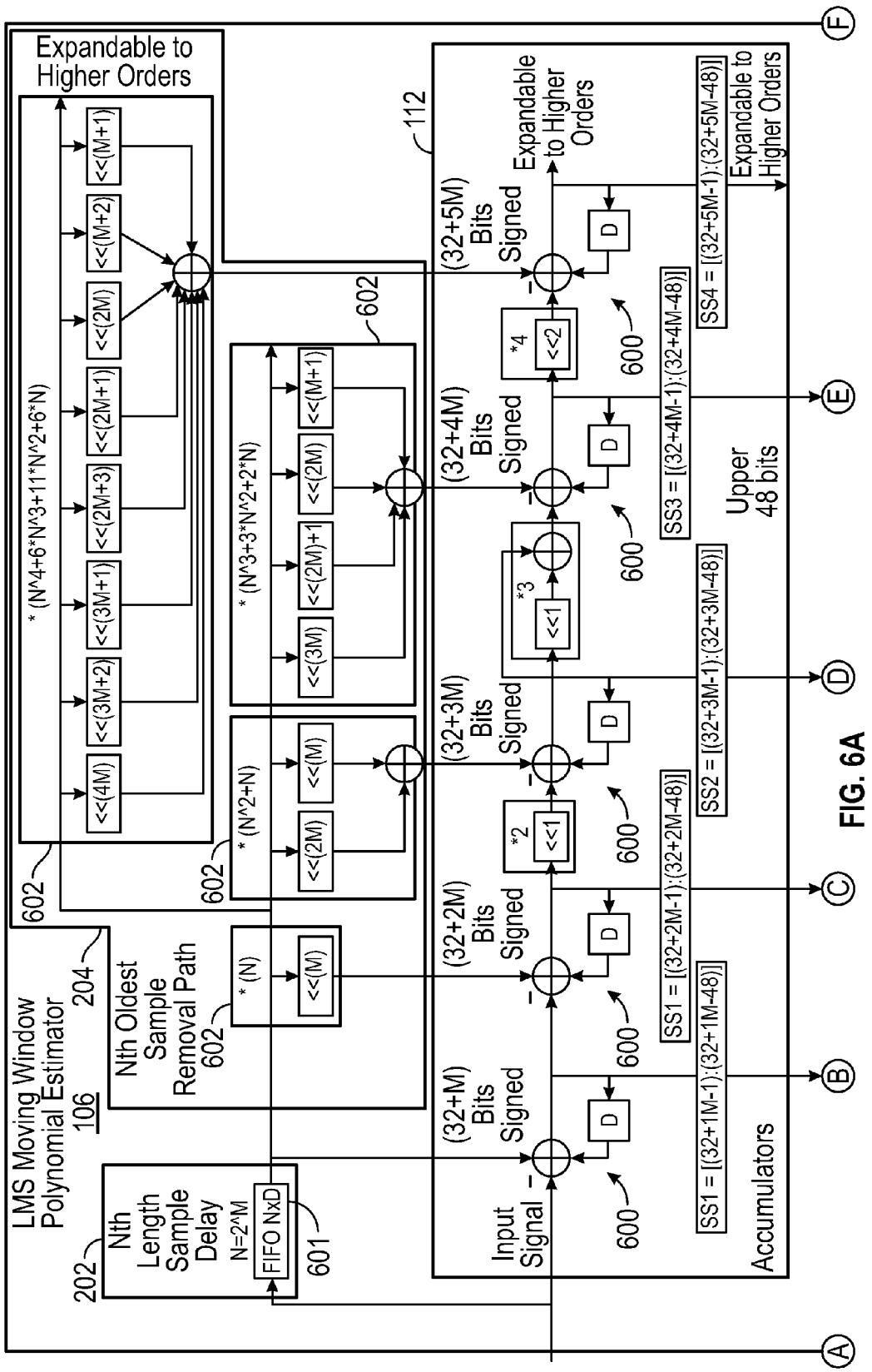
FIGS. 6A and 6B illustrate an example of implementation details for a LMS polynomial estimator according to aspects of the subject disclosure.
Figure 6B:
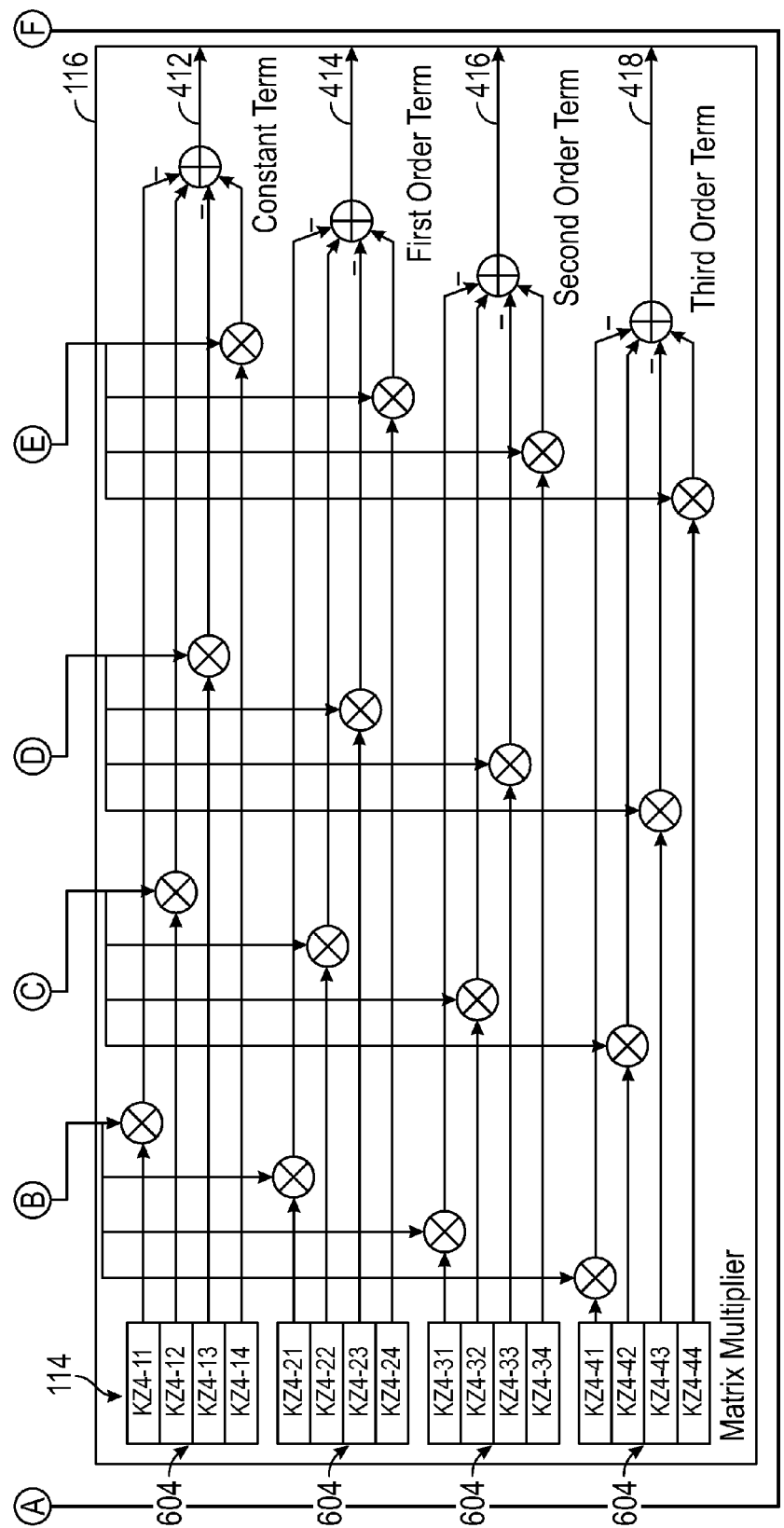

FIG. 6 illustrates further details of an implementation of polynomial estimator 106 according to some aspects of the subject disclosure. As shown in FIG. 6, accumulators 112 may include a chain of individual accumulators 600 that each receive the accumulated output of a prior accumulator in the chain. Cascaded summations are used to obtain the higher order polynomial estimations. In the example shown, accumulators 600 estimate from time "−N" to "−1" to "0" so the output estimate is valid for the following clock cycle. However, this can be modified to generate an estimate from "N" to "1" by altering the signs in the result adders.

FIG. 6 also shows how elements 604 of matrix 114 (labeled "KZ4-[row][column]" merely for convenience) are multiplied by the elements of output vector 410 from accumulators 112 in a matrix multiplication operation by matrix multiplier 116 to generate outputs 412, 414, 416, and 418.

In implementations in which a sample removal path is included, sample delay module 202 may be provided and may include FIFO register 601 that receives the incoming input signal 300 and provides samples to sample removal modules 204 and to a first accumulator 600 in a chain of accumulators 600. Sample removal modules 602 include a sample removal module 602 for each accumulator 600 after the first accumulator in the chain to remove the oldest accumulated sample and effectively perform a windowing operation. Pre-gain factors may be added between each accumulator section 600 to simplify the math, and remove divisions in the removal path. Delay module 202, accumulators 112, and sample removal modules 204 are mathematically closed to avoid negative effects from time degradation or rounding.

Figure 7A:
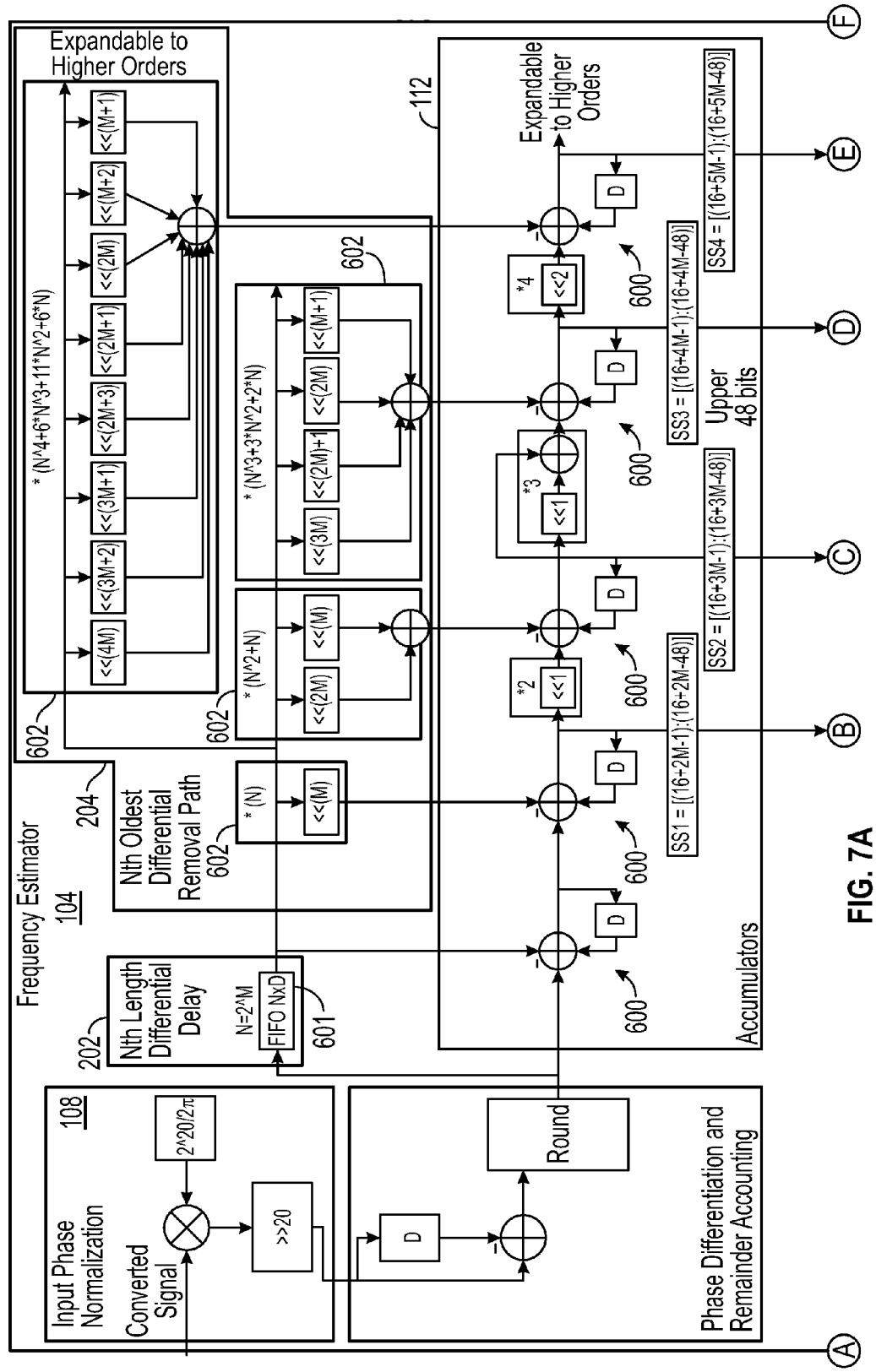
FIGS. 7A and 7B illustrate an example of implementation details for a frequency estimator according to aspects of the subject disclosure.
Figure 7B:
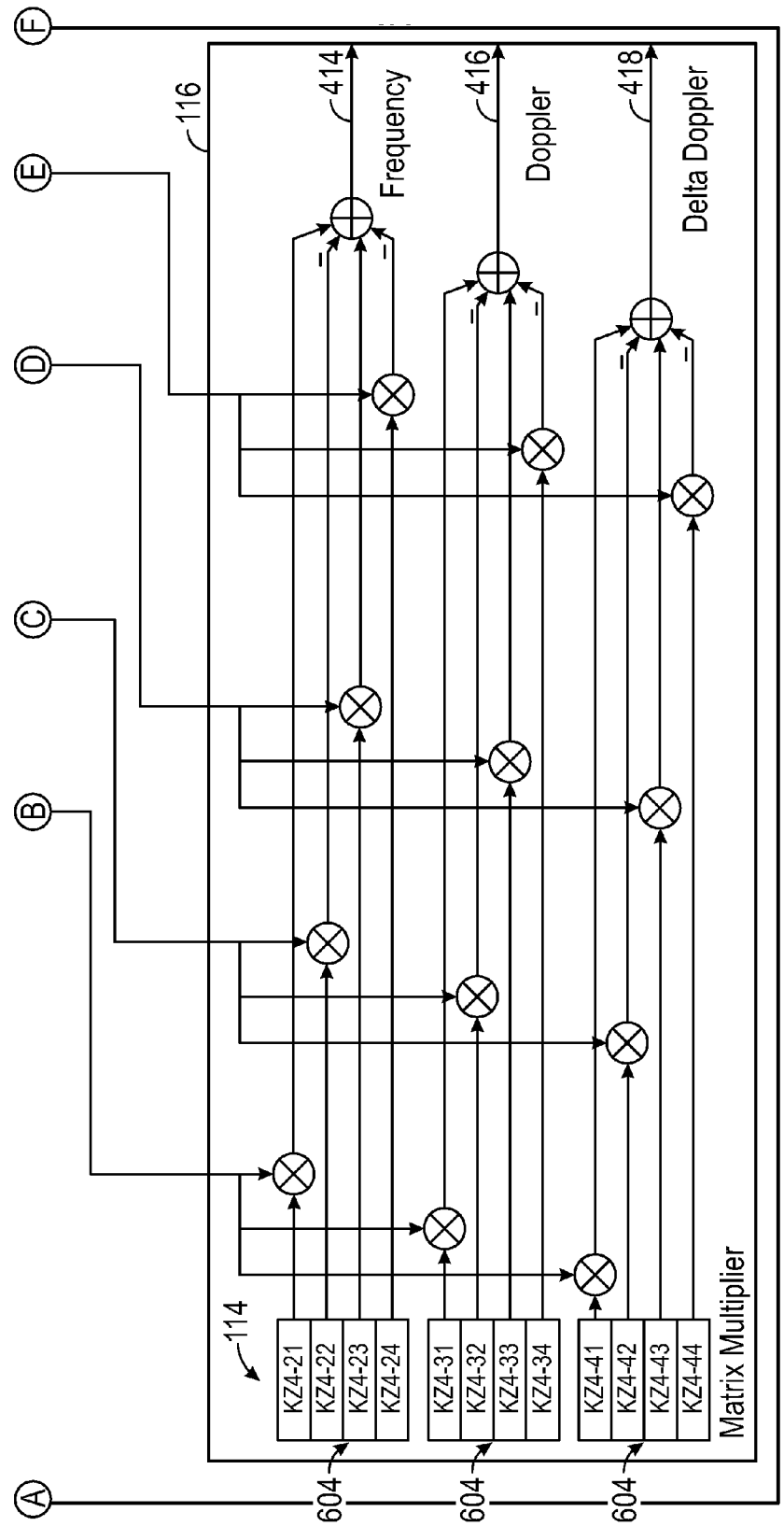

FIG. 7 illustrates further details of an implementation of frequency estimator 104 including the LMS polynomial estimator according to some aspects of the subject disclosure. Details of one implementation of phase normalization module 108 and phase differentiation module 110 are also shown. Using the differential phase outputs, as shown, allows a free unwrap of the phase with the twos compliment math on the output.

In the frequency estimator implementation, the first accumulator 600 in the chain of accumulators can be used to reconstruct the unwrapped phase for feed forwarding to the rest of the chain. By re-accumulating the differential phase, in the reconstructed widowed phase segment, the relative starting phase is forced to zero allowing the estimator to run indefinitely without an overflow. In the example of FIG. 7, the first row of matrix 114 is not used and the second, third, and fourth rows are used by matrix multiplier 116 to generate the frequency, Doppler, and delta Doppler estimation outputs.

The efficient, low computational and minimal memory footprint architectures shown and described herein in connection with FIGS. 1-7 are enabled, at least in part, by a factorization of the mapping matrix and the inverse of a geometric progression matrix such as the Vandermonde matrix to form matrix elements 604, which can be stored by the polynomial estimator and which facilitate mapping of the least mean squares approximation to an accumulator chain architecture (and which also include information that maps the actual accumulated values of the physical architecture to the underlying theoretical solution). This factorization and mapping will now be described.

A Taylor approximation of the phase function around reference time $t_0$ is defined by Eq. 1.

$$\phi(t) = \sum_{m=0}^{\infty} \frac{\phi^{(m)}(t_0)}{m!}(t-t_0)^m \quad (1)$$

$$= \frac{\phi'(t_0)}{1!}(t-t_0) + \frac{\phi''(t_0)}{2!}(t-t_0)^2 + \frac{\phi^{(3)}(t_0)}{3!}(t-t_0)^3 + \ldots$$

By converting to discrete time, with $n=T_s \cdot t$, we have (Eq. 2).

$$\phi_n = \sum_{m=0}^{\infty} \frac{\phi_{n_0}^{(m)}}{m!}(n-n_0)^m \quad (2)$$

Expressing the differential time about the reference point as $\Delta t_n \triangleq T_s \cdot (n-n_0)$, and noting that we want to estimate the instantaneous frequency in the limit $$\lim_{n \to n_0},$$

gives Eq. 3, $$\phi_n = \sum_{m=0}^{\infty} \frac{\phi_{n_0}^{(m)}}{m!} \Delta t_n^m \quad (3)$$

which allows for the third-order approximation given in Eq. 4.

$$\hat{\phi}_n \approx \phi_{n_0} + \frac{\phi'_{n_0}}{1}\Delta t + \frac{\phi''_{n_0}}{2}\Delta t^2 + \frac{\phi^{(3)}_{n_0}}{6}\Delta t^3 \quad (4)$$

Signal estimator 100 uses an Nth order model for phase to reject noise over multiple phase observations. For a vector of noisy phase measurements $\tilde{\varphi}$ with error $\underline{\epsilon}$ we have the true phase given by Eq. 5.

$$\varphi = \tilde{\varphi} + \underline{\epsilon} \quad (5)$$

A polynomial model (Eq. 6) may be applied, $$\varphi = f(\underline{\Delta t}, \underline{\beta}) = V\underline{\beta} = X\tilde{\underline{\varphi}} \quad (6)$$

where X is a geometrix progression matrix (in this case the third-order Vandermonde matrix (Eq. 7)), and $\underline{\beta}$ are the unknown coefficients.

$$V = \begin{bmatrix} | & | & | & | \\ \underline{1} & \underline{t} & \underline{t}^2 & \underline{t}^3 \\ | & | & | & | \end{bmatrix} = \begin{bmatrix} 1 & t_{-M+1} & t_{-M+1}^2 & t_{-M+1}^3 \\ 1 & t_{-M+2} & t_{-M+2}^2 & t_{-M+2}^3 \\ \vdots & \vdots & \vdots & \vdots \\ 1 & t_{-1} & t_{-1}^2 & t_{-1}^3 \\ 1 & t_0 & t_0^2 & t_0^3 \end{bmatrix} = \quad (7)$$

$$\begin{bmatrix} 1 & (-M+1)T_s & (-M+1)^2 T_s^2 & (-M+1)^3 T_s^3 \\ 1 & (-M+2)T_s & (-M+2)^2 T_s^2 & (-M+2)^3 T_s^3 \\ \vdots & \vdots & \vdots & \vdots \\ 1 & T_s & -T_s^2 & T_s^3 \\ 1 & 0 & 0 & 0 \end{bmatrix}$$

Substituting Eq. 4 in Eq. 6, we have (Eq. 8)

$$\underline{\beta} = \begin{bmatrix} \beta_0 \\ \beta_1 \\ \beta_2 \\ \beta_3 \end{bmatrix} = \begin{bmatrix} \tilde{\phi}_n \\ \tilde{\phi}'_n \\ \frac{1}{2}\tilde{\phi}''_n \\ \frac{1}{6}\tilde{\phi}'''_n \end{bmatrix} \quad (8)$$

which may be solved in terms of phase measurements $\tilde{\underline{\varphi}}$ (Eq. 9).

$$\tilde{\underline{\phi}} = \begin{bmatrix} \tilde{\phi}_n \\ \tilde{\phi}'_n \\ \tilde{\phi}''_n \\ \tilde{\phi}'''_n \end{bmatrix} = \begin{bmatrix} \beta_0 \\ \beta_1 \\ 2\beta_2 \\ 6\beta_3 \end{bmatrix} \quad (9)$$

Constants may be distributed over the matrix V to yield X, as in Eq. 10 and Eq. 11.

$$X = \begin{bmatrix} | & | & | & | \\ \underline{1} & \underline{t} & 2\underline{t}^2 & 6\underline{t}^3 \\ | & | & | & | \end{bmatrix} = \quad (10)$$

$$\begin{bmatrix} 1 & (-M+1)T_s & 2(-M+1)^2 T_s^2 & 6(-M+1)^3 T_s^3 \\ 1 & (-M+2)T_s & 2(-M+2)^2 T_s^2 & 6(-M+2)^3 T_s^3 \\ \vdots & \vdots & \vdots & \vdots \\ 1 & -T_s & -2T_s^2 & -6T_s^3 \\ 1 & 0 & 0 & 0 \end{bmatrix}$$

$$\tilde{\underline{\varphi}} = \begin{bmatrix} \tilde{\phi}_n \\ \tilde{\phi}'_n \\ \tilde{\phi}''_n \\ \tilde{\phi}'''_n \end{bmatrix} \quad (11)$$

Then, solving for the pseudo-inverse, and noting that X is a purely real matrix, Eq. 12:

$$X^+ = (X^*X)^{-1}X^* = (X^TX)^{-1}X^T \quad (12)$$

yields a least mean squares (LMS) estimate of the phase and first three derivatives $\hat{\underline{\varphi}}$ (Eq. 13).

$$\hat{\underline{\varphi}} = X^+ \tilde{\underline{\varphi}} \quad (13)$$

with residuals (Eq. 14).

$$\epsilon = \tilde{\underline{\varphi}} - \hat{\underline{\varphi}} \quad (14)$$

As noted above, phase-unwrapping may be performed (e.g., by modules 108 and 110) when polynomial estimator 106 is implemented in frequency estimator 104, noting that phase-unwrapping may be omitted in, for example, first-differences with two's compliment arithmetic with one decimal bit of precision. Since x+1 is congruent to $x+2^N+1 \pmod{2^N}$ under two's compliment Q1.X (Eq. 15) where N is the number of bits representing x, we can write (Eq. 16) where W[•] is the phase unwrap function given by Eq. 17. Thus, the unwrapped phase may be reconstructed from first differences by integration:

$$x + 1 \equiv (x + 2^N + 1) \bmod 2^N \quad (15)$$

$$\Delta \phi_n = \phi_n - \phi_{n-1} = W[\phi_n] - W[\phi_{n-1}] \quad (16)$$

$$W[\phi_n] = \begin{cases} W[\phi_{n-1}] + \Delta\phi_n + 2\pi & \text{if } \Delta\phi_n > \pi + \epsilon \\ W[\phi_{n-1}] + \Delta\phi_n - 2\pi & \text{if } \Delta\phi_n < -\pi - \epsilon \\ W[\phi_{n-1}] + \Delta\phi_n & \text{otherwise} \end{cases} \quad (17)$$

The LMS direct estimator stores moving successive powers of sums to factor to maintain a time-phase product, which is factored out of the original projection matrix. The time-phase product is the elementwise multiplication of windowed phase samples with their respective accumulation period, which is equal to the sample period. This product in performed by successive accumulators, which contains the sliding window of unwrapped phase. The estimator may then be re-written as Eq. 18.

$$\hat{\phi} = X^+ \Phi \quad (18)$$

$$= (X^TX)^{-1}X^T\Phi$$

$$= (X^TX)^{-1} \begin{bmatrix} \sum_{n=0}^{m} \phi_n \\ T_s \sum_{n=0}^{m} n\phi_n \\ T_s^2 \sum_{n=0}^{m} n^2\phi_n \\ T_s^3 \sum_{n=0}^{m} n^3\phi_n \end{bmatrix}$$

$$= (X^TX)^{-1} \text{DIAG}(1, T_s, T_s^2, T_s^3) \begin{bmatrix} \sum_n \phi_n \\ \sum_n n\phi_n \\ \sum_n n^2\phi_n \\ \sum_n n^3\phi_n \end{bmatrix}$$

Where $$K = (X^TX)^{-1} \quad (19)$$

Equations 18 and 19 provide one expression of a factorization of the least squares normal equation in solving for coefficients when modelled by a Vandermonde matrix. In the LMS Direct Estimator, a negative time convention is used, and thus X is expressed as Eq. 20.

$$X = \begin{bmatrix} 1 & (-M)T_s & 2(-M)^2 T_s^2 & -6(-M)^3 T_s^3 \\ 1 & -(-M+1)T_s & 2(-M+1)^2 T_s^2 & -6(-M+1)^3 T_s^3 \\ \vdots & \vdots & \vdots & \vdots \\ 1 & (-2)T_s & 2(-2)^2 T_s^2 & -6(-2)^3 T_s^3 \\ 1 & T_s & 2T_s^2 & -6T_s^3 \end{bmatrix} \quad (20)$$

For numerical stability, the polynomial estimator may normalize K to be restricted to a unit interval as shown in Eq. 21, allowing X to be re-expressed in terms of normalized matrix $\tilde{X}$ by means of scale matrices.

$$X = \tilde{X} \cdot \text{DIAG}(1, MT_s, 2M^2T_s^2, 6M^3T_s^3) \quad (21)$$

K can now be written in terms of a normalized quadratic as shown in Eq. 22, given as $\tilde{K} \triangleq (\tilde{X}^T\tilde{X})^{-1}$.

$$K = (\tilde{X}^T\tilde{X})^{-1} \circ \begin{bmatrix} M^0 & M^1 & M^2 & M^3 \\ M^1 & M^2 & M^3 & M^4 \\ M^2 & M^3 & M^4 & M^5 \\ M^3 & M^4 & M^5 & M^6 \end{bmatrix} \cdot \quad (22)$$

$$\text{DIAG}\left(1, \frac{1}{MT_s}, \frac{2}{M^2T_s^2}, \frac{6}{M^3T_s^3}\right)$$

$$= \tilde{K} \circ D_1 D_2$$

where ○ denotes the Hadamard product, i.e. $(A \circ B)_{i,j} = (A)_{i,j} \cdot (B)_{i,j}$, and $$D_{1(4\times4)} = \begin{bmatrix} M^0 & M^1 & M^2 & M^3 \\ M^1 & M^2 & M^3 & M^4 \\ M^2 & M^3 & M^4 & M^5 \\ M^3 & M^4 & M^5 & M^6 \end{bmatrix} = \begin{bmatrix} M^0 & 0 & 0 & 0 \\ M^1 & 0 & 0 & 0 \\ M^2 & 0 & 0 & 0 \\ M^3 & 0 & 0 & 0 \end{bmatrix} \quad (23)$$

$$\begin{bmatrix} M^0 & M^1 & M^2 & M^3 \\ 0 & 0 & 0 & 0 \\ 0 & 0 & 0 & 0 \\ 0 & 0 & 0 & 0 \end{bmatrix}$$

and, $$D_2 = \text{DIAG}\left(1, \frac{1}{MT_s}, \frac{2}{M^2T_s^2}, \frac{6}{M^3T_s^3}\right) \quad (24)$$

The estimator may now be written as Eq. 25.

$$\hat{\underline{\varphi}} = \tilde{K} \circ D_1 D_2 X^T \Phi \quad (25)$$

The following describes how to recover the time phase product $X^T\Phi$ using sequential windowed accumulators 600 in a feed-forward structure. Successive powers of sums are manipulated to isolate the constant (Eq. 26), linear (Eq. 27), quadratic (Eq. 28), and cubic (Eq. 29) time components needed to expand the polynomial as shown below.

$$A_m = \sum_{k_0=1}^{m} \phi_n = m\Phi \tag{26}$$

$$B_m = \sum_{k_0=1}^{m}\sum_{k_1=1}^{k_0} \phi_n = \Phi\sum_{k_0=1}^{m} k_0 \tag{27}$$

$$= \frac{m(m+1)}{2}\Phi = \frac{m^2+m}{2}\Phi$$

$$C_m = \sum_{k_0=1}^{m}\sum_{k_1=1}^{k_0}\sum_{k_2=1}^{k_1} \phi_n = \Phi\sum_{k_0=1}^{m}\sum_{k_1=1}^{k_0} k_1 = \Phi\sum_{k_0=1}^{m}\frac{k_0^2+k_0}{2} \tag{28}$$

$$= \frac{1}{2}\left[\frac{m(m+1)(2m+1)}{6} + \frac{m^2+m}{2}\right]\Phi =$$

$$\frac{m^3}{6}\Phi + \frac{m^2}{2}\Phi + \frac{m}{3}\Phi$$

$$D_m = \sum_{k_0=1}^{m}\sum_{k_1=1}^{k_0}\sum_{k_2=1}^{k_1}\sum_{k_3=1}^{k_2} \phi_n \tag{29}$$

$$= \frac{1}{6}\Phi\sum_{k_0=1}^{m} k_0^3 + \frac{1}{2}\Phi\sum_{k_0=1}^{m} k_0^2 + \frac{1}{3}\Phi\sum_{k_0=1}^{m} k_0$$

$$= \frac{1}{6}\Phi\left(\frac{m^4}{4} + \frac{m^3}{2} + \frac{m^2}{4}\right) + \frac{1}{2}\Phi\left(\frac{m^3}{3} + \frac{m^2}{2} + \frac{m}{6}\right) +$$

$$\frac{1}{3}\Phi\left(\frac{m^2+m}{2}\right)$$

$$= \frac{m^4}{24}\Phi + \frac{m^3}{4}\Phi + \frac{11m^2}{24}\Phi + \frac{m}{4}\Phi$$

To simplify the isolation of terms, the sums (A, B, C, and D) may be pre-scaled by 1, 2, 6, and 24, respectively, giving the following relation (Eq. 30).

$$\hat{\Sigma} = \begin{bmatrix}\hat{A}\\\hat{B}\\\hat{C}\\\hat{D}\end{bmatrix} \triangleq \begin{bmatrix}A\\2B\\6C\\24D\end{bmatrix} \tag{30}$$

Mapping back from the accumulator structure to successive powers of sums will now be described. The first sum maps directly to the first accumulator 600 in the feed-forward structure (Eqs. 36-38).

$$m) \overline{\phantom{m}}\!\!\!\begin{array}{r}1\\\phantom{m}\end{array} \tag{31}$$
$$\underline{-m}$$
$$0$$

or, equivalently $$m = m \cdot 1 \tag{32}$$
$$\underline{-m}$$
$$0$$

thus $$\Rightarrow \sum_{n=0}^{m} 1 = \hat{A}_m \tag{33}$$

The linear term may be recovered by means of polynomial division using recursive back-substitution.

$$(m^2+m) \overline{\phantom{)}\!\!\!\begin{array}{r}\frac{1}{2}\\[-2pt]\frac{1}{2}m^2+\frac{1}{2}m\end{array}} \tag{34}$$
$$\underline{-\frac{1}{2}m^2-\frac{1}{2}m}$$
$$0$$

or, equivalently $$\frac{1}{2}m^2+\frac{1}{2}m = (m^2+m)\frac{1}{2} \tag{35}$$
$$\underline{-\frac{1}{2}m^2-\frac{1}{2}m}$$
$$0$$

thus $$\Rightarrow \sum_{n=0}^{m} n = 2\frac{1}{2}\hat{B}_m \tag{36}$$

Likewise, for the quadratic term.

$$(m^3+3m^2+2m) \overline{\phantom{)}\!\!\!\begin{array}{r}\frac{1}{3}\\[-2pt]\frac{1}{3}m^3+\frac{1}{2}m^2+\frac{1}{6}m\end{array}} \tag{37}$$
$$\underline{-\frac{1}{3}m^3-m^2+\frac{2}{3}m}$$
$$-\frac{1}{2}m^2-\frac{1}{2}m$$

or, equivalently $$\frac{1}{3}m^3+\frac{1}{2}m^2+\frac{1}{6}m = (m^3+3m^3+2m)\frac{1}{3}-\frac{1}{2}m^2-\frac{1}{2}m \tag{38}$$
$$\underline{-\frac{1}{3}m^3-m^2-\frac{2}{3}m}$$
$$-\frac{1}{2}m^2-\frac{1}{2}m$$

then $$\Rightarrow \sum_{n=0}^{m} n^2 = \frac{1}{2}m^2+\frac{1}{2}m = \frac{1}{3}\tilde{C}_m - \frac{1}{2}m^2-\frac{1}{2}m \tag{39}$$

so, $$(m^2+m) \overline{\phantom{)}\!\!\!\begin{array}{r}-\frac{1}{2}\\[-2pt]-\frac{1}{2}m^2-\frac{1}{2}m\end{array}} \tag{40}$$
$$\underline{\frac{1}{2}m^2+\frac{1}{2}m}$$
$$0$$

or, equivalently $$-\frac{1}{2}m^2-\frac{1}{2}m = (m^2+m)-\frac{1}{2} \tag{41}$$
$$\underline{\frac{1}{2}m^2+\frac{1}{2}m}$$
$$0$$

thus $$\Rightarrow \sum_{n=0}^{m} n^2 = \frac{1}{2}m^2+\frac{1}{2}m = \frac{1}{3}\tilde{C}_m - \frac{1}{2}\hat{B}_m \tag{42}$$

The last accumulator 600 (in this example), gives the cubic term.

$$m^4 + 6m^3 + 11m^2 + 6m) \overline{\begin{array}{l} \frac{1}{4}m^4 + \frac{1}{2}m^3 + \frac{1}{4}m^2 \\ -\frac{1}{4}m^4 - \frac{3}{2}m^3 - \frac{11}{4}m^2 - \frac{3}{2}m \\ \hline -m^3 - \frac{5}{2}m^2 - \frac{3}{2}m \end{array}} \tag{43}$$

or, equivalently $$\frac{1}{4}m^4 + \frac{1}{2}m^3 + \frac{1}{4}m^2 = (m^4 + 6m^3 + 11m^2 + 6m)\frac{1}{4} - m^3 - \frac{5}{2}m^2 - \frac{3}{2}m$$
$$-\frac{1}{4}m^4 - \frac{3}{2}m^3 - \frac{11}{4}m^2 - \frac{3}{2}m$$
$$-m^3 - \frac{5}{2}m^2 - \frac{3}{2}m \tag{44}$$

then $$\Rightarrow \sum_{n=0}^{m} n^3 = \frac{1}{4}m^4 + \frac{1}{2}m^3 + \frac{1}{4}m^2 = \frac{1}{4}\hat{C}_m - m^3 - \frac{5}{2}m^2 - \frac{3}{2}m \tag{45}$$

so, $$m^3 + 3m^2 + 2m) \overline{\begin{array}{l} -m^3 - \frac{5}{2}m^2 - \frac{3}{2}m \\ \underline{m^3 + 3m^2 + 2m} \\ \frac{1}{2}m^2 + \frac{1}{2}m \end{array}} -1 \tag{46}$$

or, equivalently $$-m^3 - \frac{5}{2}m^2 - \frac{3}{2}m = (m^3 + 3m^2 + 2m) \cdot -1 + \frac{1}{2}m^2 + \frac{1}{2}m$$
$$\underline{m^3 + 3m^2 + 2m}$$
$$\frac{1}{2}m^2 + \frac{1}{2}m \tag{47}$$

then $$\Rightarrow \sum_{n=0}^{m} n^3 = \frac{1}{4}m^4 + \frac{1}{2}m^3 + \frac{1}{4}m^2 = \frac{1}{4}\hat{C}_m - \hat{B}_m + \frac{1}{2}m^2 - \frac{1}{2}m \tag{48}$$

so, $$m^2 + m) \overline{\begin{array}{l} \frac{1}{2}m^2 + \frac{1}{2}m \\ -\frac{1}{2}m^2 - \frac{1}{2}m \\ \hline 0 \end{array}} \frac{1}{2} \tag{49}$$

or, equivalently $$\frac{1}{2}m^2 + \frac{1}{2}m = (m^2 + m)\frac{1}{2}$$
$$-\frac{1}{2}m^2 - \frac{1}{2}m$$
$$0 \tag{50}$$

thus $$\Rightarrow \sum_{n=0}^{m} n^3 = \frac{1}{4}m^4 + \frac{1}{2}m^3 + \frac{1}{4}m^2 = \frac{1}{4}\hat{C}_m - \hat{B}_m + \frac{1}{2}\hat{A}_m \tag{51}$$

From the above accumulator mappings, a transfer matrix Z may be constructed that transforms consecutive sums from the feed-forward accumulator structure back to consecutive sums of powers (Eq. 57 and Eq. 58). To account for the negative time convention used to express X, the even-power rows $\hat{B}_m$ and $\hat{D}_m$ have been negated.

$$Z \quad \begin{array}{cccc} 1 & \Sigma n & \Sigma n^2 & \Sigma n^3 \end{array} \tag{52}$$

$$Z = \begin{array}{c} \hat{A}_m \\ \hat{B}_m \\ \hat{C}_m \\ \hat{D}_m \end{array} \begin{pmatrix} 1 & 0 & 0 & 0 \\ 0 & -\frac{1}{2} & -\frac{1}{2} & -\frac{1}{2} \\ 0 & 0 & \frac{1}{3} & 1 \\ 0 & 0 & 0 & -\frac{1}{4} \end{pmatrix}$$

$$\Sigma = Z\hat{\Sigma} = \begin{bmatrix} \Sigma n \\ \Sigma n^2 \\ \Sigma n^3 \\ \Sigma n^4 \end{bmatrix} = \begin{bmatrix} 1 & 0 & 0 & 0 \\ 0 & -\frac{1}{2} & -\frac{1}{2} & -\frac{1}{2} \\ 0 & 0 & \frac{1}{3} & 1 \\ 0 & 0 & 0 & -\frac{1}{4} \end{bmatrix} \begin{bmatrix} \hat{A}_m \\ \hat{B}_m \\ \hat{C}_m \\ \hat{D}_m \end{bmatrix} = \tag{53}$$

$$\begin{bmatrix} 1 & 0 & 0 & 0 \\ 0 & -\frac{1}{2} & -\frac{1}{2} & -\frac{1}{2} \\ 0 & 0 & \frac{1}{3} & 1 \\ 0 & 0 & 0 & -\frac{1}{4} \end{bmatrix} \begin{bmatrix} A_m \\ 2B_m \\ 6C_m \\ 24D_m \end{bmatrix}$$

This transfer matrix Z (sometimes referred to herein as a mapping matrix that maps the nonlinear realizable accumulator structure to the theoretical LMS transfer matrix), recovers the time-phase inner product, and can be recombined with the estimation matrix to form the final LMS direct estimator coefficients 604 of LMS direct estimator matrix 114 (Eq. 59).

$$\underline{\hat{K}} = ZK \bigcirc D_1 D_2 \tag{54}$$

where $K = (X^T X)^{-1}$ is the inverse of the original Vandermonde quadratic (Eq. 10), Z is the accumulator-to-sums-of-powers transfer matrix (Eq. 60)

$$Z = \begin{bmatrix} 1 & 0 & 0 & 0 \\ 0 & -\frac{1}{2} & -\frac{1}{2} & -\frac{1}{2} \\ 0 & 0 & \frac{1}{3} & 1 \\ 0 & 0 & 0 & -\frac{1}{4} \end{bmatrix} \quad (55)$$

and $D_1$ is the length normalization matrix (Eq 56)

$$D_{1(4\times4)} = \begin{bmatrix} M^0 & M^1 & M^2 & M^3 \\ M^1 & M^2 & M^3 & M^4 \\ M^2 & M^3 & M^4 & M^5 \\ M^3 & M^4 & M^5 & M^6 \end{bmatrix} = \quad (56)$$

$$\begin{bmatrix} M^0 & 0 & 0 & 0 \\ M^1 & 0 & 0 & 0 \\ M^2 & 0 & 0 & 0 \\ M^3 & 0 & 0 & 0 \end{bmatrix} \begin{bmatrix} M^0 & M^1 & M^2 & M^3 \\ 0 & 0 & 0 & 0 \\ 0 & 0 & 0 & 0 \\ 0 & 0 & 0 & 0 \end{bmatrix}$$

and $D_2$ is time-length scale matrix (Eq 57)

$$D_2 = \quad (57)$$

$$\text{DIAG}\left(1, \frac{1}{MT_s}, \frac{2}{M^2T_s^2}, \frac{6}{M^3T_s^3}\right) = \begin{bmatrix} 1 & 0 & 0 & 0 \\ 0 & \frac{1}{MT_s} & 0 & 0 \\ 0 & 0 & \frac{2}{M^2T_s^2} & 0 \\ 0 & 0 & 0 & \frac{6}{M^3T_s^3} \end{bmatrix}$$

Equations 59-62 provide the final computation for elements 604 of matrix 104 using the pseudo-inverse of the Vandermonde matrix, the time and length normalization matrices $D_1$ and $D_2$, and the transfer matrix Z. Matrix 104 (see Eq. 59) is not time varying and therefore can be precomputed and stored by the polynomial estimator. The output estimate is then written as Eq. 63, where $\hat{\Sigma}$ is the accumulator vector 410.

$$\hat{\phi} = \hat{K}\hat{\Sigma} = \hat{K}\begin{bmatrix} \hat{A}_m \\ \hat{B}_m \\ \hat{C}_m \\ \hat{D}_m \end{bmatrix} \quad (58)$$

Up to this point, an estimator has been presented that provides a phase, frequency, Doppler, and delta Doppler estimate based on prior observations. In general, the fitted polynomial may be evaluated at any time. To modify the signal estimator for predictive or past estimations, the reference time $t_0$ may be adjusted by a time of, for example, $t_f = kT_s$ seconds, where $t_f$ is an integer multiple (k) of sample period ($T_s$). Substituting the prediction time into equations for phase (Eq. 64), frequency (Eq. 65), Doppler (Eq. 66)

$$\phi(t) = \phi_0 + \phi_0'(t) + \frac{1}{2}\phi_0''(t^2) + \frac{1}{6}\phi_0^{(3)}(t^3) \quad (59)$$

$$\phi'(t) = \phi_0' + \phi_0''(t) + \frac{1}{2}\phi_0^{(3)}(t^2) \quad (60)$$

$$\phi''(t) = \phi_0'' + \phi_0^{(3)}(t) \quad (61)$$

gives the prediction (Eq. 67)

$$\hat{\phi}_k = \begin{bmatrix} \phi_k \\ \phi_k' \\ \phi_k'' \\ \phi_k^{(3)} \end{bmatrix} = \begin{bmatrix} 1 & kT_s & \frac{1}{2}k^2T_s^2 & \frac{1}{6}k^3T_s^3 \\ 0 & 1 & kT_s & \frac{1}{2}k^2T_s^2 \\ 0 & 0 & 1 & kT_s \\ 0 & 0 & 0 & 1 \end{bmatrix} \begin{bmatrix} \phi_0 \\ \phi_0' \\ \phi_0'' \\ \phi_0^{(3)} \end{bmatrix} = TKX^T\Phi \quad (62)$$

where $$T = \begin{bmatrix} 1 & kT_s & \frac{1}{2}k^2T_s^2 & \frac{1}{6}k^3T_s^3 \\ 0 & 1 & kT_s & \frac{1}{2}k^2T_s^2 \\ 0 & 0 & 1 & kT_s \\ 0 & 0 & 0 & 1 \end{bmatrix} \quad (63)$$

For real-time, offline, and/or predictor implementations, frequency estimator 104 performs the mathematical operation of the multiplication of windowed phase $\Phi$ with X from (Eq. 10). To produce the windowed phase, the detected phase is first normalized to the unit interval (e.g., by phase normalization module 108). The first difference is taken (e.g., by phase differentiation module 110). The differentiated phase is integrated using a feedback loop, while the Mth delayed sample is subtracted. This subtraction produces a moving integration window of phase, locking the constant of integration to the Mth delayed phase difference. The windowed phase is used in four successive moving window integrations in a feed-forward structure (e.g., by accumulators 112). The constants of summation for each consecutive power as identified in Eq. 26, Eq. 27, Eq. 28, and Eq. 29 may be used in the subtractive path to window the integration. The integrals themselves are pre-scaled as shown in Eq. 30 to allow the subtractive path to be expressed in terms of shift operations.

The resulting integrals contain the time-phase product of the windowed phase and a time ramp. That is, each successive integral contains the inner product of the phase window with one of the elements in $\hat{\Sigma}$ (Eq. 30). Each one of the elements is an approximation of one of a constant, linear, quadratic, and cubic curve of the form $nM^kT_s^k$. Although scaled and shifted, the exact curves may be recovered from a linear combination from the row space of $\hat{\Sigma}$, given by the transfer matrix Z (Eq. 60). This transfer matrix has been combined with the final coefficients, such that it does not need to be performed explicitly by any circuit, and the approximations are used directly.

The final estimate may then be computed by frequency estimator 104 (e.g., using polynomial estimator 106) from a matrix multiplication of $\hat{K}$ (Eq. 59) and $\hat{\Sigma}$ (Eq. 30) by matrix multiplier 116.

In accordance with aspects of the subject disclosure, a general polynomial estimator 106 is described. The general polynomial estimator 106 performs a least mean squares (LMS) polynomial estimate of an inbound signal. Although described herein, in some examples, as being implemented in a frequency estimator, the general polynomial estimator is applicable in various systems in which a high-resolution, offline or real-time, estimate of a signal is desired, and the underlying signal follows a polynomial model of any order.

In accordance with aspects of the subject disclosure, the general polynomial estimator may provide the following features/benefits: a low hardware footprint, a low computational complexity, real-time estimation (e.g., running at the same rate as the in-bound signal), adaptability to a polynomial model of any desired order, signal estimation of samples offline (e.g., at a time other than the current time) for use as a predictor, and/or general adaptability for various high-accuracy real-time applications.

In accordance with aspects of the subject disclosure, the polynomial estimator or a frequency estimator implementing the polynomial estimator implements a unique use of system memory that allows for the evaluation of the Least Squares Normal Equations with a very low computational footprint which allows the polynomial estimator and/or the frequency estimator to be realizable in computationally-constrained environments such as embedded systems. Existing frequency estimators would, in contrast, require a comparatively large matrix multiplication (e.g., many more multiplication operations such as orders of magnitude more multiplication operations). The frequency estimator thus allows for low computational complexity (and/or real-time) signal estimation with a high degree of accuracy, greater than what has been traditionally possible using existing solutions.

In accordance with aspects of the subject disclosure, the general polynomial estimator makes a unique use of system memory (state) to perform the mathematical equivalent of the Least Squares Normal Equations. The polynomial estimator stores a factorization matrix based on factors of the pseudo-inverse in the normal equations into, for example, three matrices: (1) a quadratic matrix, (2) a time scale matrix, and (3) a narrow normalized matrix. Multiplication of the narrow normalized matrix with the inbound signal may be performed using a simple moving window of the inbound signal, which may be performed using two parts of the estimator: an accumulator structure, producing a normalized product vector, and a transfer matrix. The combination of these two performs the narrow normalized matrix multiplication.

In accordance with aspects of the subject disclosure, the transfer matrix, time matrix, and quadratic matrix are all small in dimension and fixed so they are combined into a single matrix operation. This final matrix is applied to the normalized product vector to produce the result and only has a number of multiplies equal to the order of the polynomial squared.

In accordance with aspects of the subject disclosure, the basic accumulator structure used to produce the normalized product vector is a chain of accumulators with each accumulator (successively) accumulating the accumulation of the previous stage, using a number of accumulator stages corresponding to the order of the polynomial being estimated. In this way, a very basic additive structure is provided that is low computation cost to implement in either an FPGA or in software. After 'n' cycles, samples of the in-bound signal are fully computed into the accumulator structure and the final matrix can be applied to the output normalized product vector. On each clock cycle the computation includes only as many additions as stages in the accumulator.

In accordance with aspects of the subject disclosure, for the real-time aspect, a delay line (e.g., including sample delay module 202) and a removal path (e.g., including removal module 204) are added to the accumulator structure. This delay line is the length of the window 'n' and is a simple FIFO structure. Upon exiting the FIFO, a particular sample accumulation is subtracted from the accumulator structure. For the first accumulator, this is simply the sample, for the second accumulation, it is the sample times the length 'n', and so on. In some examples, 'n' may be fixed to a power of 2 so that the multiplication becomes a simple bit shift and the removal path becomes fairly simplistic. By removing the effects of the oldest sample in the accumulator structure and then clocking a new sample in, a moving window effect can be created.

In accordance with aspects of the subject disclosure, a solution for non-real-time estimation of comparable accuracy utilizes brute-force matrix multiplication, but this method may be computationally too extensive to be implemented in real time whether it be in an FGPA or in software. Other predictive/adaptive models with a lower computational cost are contemplated that can track/estimate the signal, but may have relatively poor noise rejection in contrast with the estimators described herein. These models can be made more complex to help with their performance but may still provide relatively low accuracy for their complexity.

In accordance with some aspects, the systems and methods disclosed herein are more accurate with far less computation, going from a computational complexity of O(n) to O(1) where 'n' is the length of the samples to be estimated over. As the notation depicts the systems and methods disclosed herein decouple the estimation length from the computational complexity thus greatly reducing the complexity.

In accordance with some aspects, the systems and methods disclosed herein also work in real time producing an estimation every time the system clock is updated with minimal computational latency.

In accordance with some aspects, the systems and methods disclosed herein work within a window of the last 'n' input samples, this windowing allowing for continual updates in real time.

In accordance with some aspects, the systems and methods disclosed herein also can provide estimates to any position in time based on the current window of data without changing anything more than a set of coefficients.

In accordance with some aspects, a complexity of approximately 800,000 operations may be reduced down to approximately 50 per clock cycle using the systems and methods disclosed herein.

In accordance with some aspects, disclosed herein is a Least Mean Squares (LMS) frequency estimator. The LMS frequency estimator performs an estimate of the frequency, Doppler, delta Doppler characteristics of an electronic input signal (and higher order time derivatives of phase if desired). The estimate is performed at the inbound sample rate, in some implementations, and the error is minimal in the least squares sense to a high degree of accuracy for well-behaved signals of polynomial order. The estimator works with a low memory footprint with low computational complexity, making it an ideal solution for high accuracy estimation in real-time or embedded systems. The frequency estimator may be embedded in any of various systems in which a (1) high-accuracy, (2) real-time, (3) frequency and Doppler estimator is desired.

In accordance with some aspects, the frequency estimator makes a unique use of system memory (state) to perform the Least Squares Normal Equation operations based on a factorization of the pseudo-inverse in the normal equations into, for example, two matrices: (1) a quadratic matrix, and (2) a narrow matrix. Multiplication of the narrow matrix with the inbound signal may be performed using a moving window of the inbound signal. The remaining product and quadratic matrix are both small in dimension, and their final product may be computed using a number of multiplies equal to the order of the polynomial. The estimation may be performed using only a number of multiplications equal to the order of the polynomial at each clock cycle. The order of the polynomial may be independent of the use of multipliers. The number of observation samples may be independent of the use of multipliers. Existing solutions scale with the number, n, of observation samples, approximately O(n), in contrast to the systems and methods disclosed herein which have constant time complexity O(1).

Implementations in which real-time estimation is desired may utilize one or more Phase-Locked Loops (PLLs). Non real-time estimation of comparable accuracy may also be performed.

In accordance with some aspects, the polynomial estimator is capable of performing real-time polynomial estimation and evaluation of successive time derivatives of a function (e.g., the frequency, Doppler, rate of change of Doppler or delta Doppler, and/or higher order time derivatives of phase in a frequency estimator implementation) of a single variable up to a specified polynomial order.

In accordance with some aspects, a LMS moving window polynomial estimator provides an accurate estimate of instantaneous time derivatives of an inbound signal. For well-behaved signals, a reasonable Taylor approximation may be made about the current sample, using up to a specified number of time derivatives. A linear regression of polynomial order three may be used to provide an estimate in the presence of observation noise.

In accordance with some aspects, in contrast with brute-force matrix multiplication (which can be computationally inefficient within FPGA resource constraints), the systems and methods disclosed herein implement an LMS projection matrix that is decomposed into the product of a Toeplitz matrix and a matrix compatible with the phase matrix. The product of the compatible matrix and phase matrix may be computed directly in hardware using a feed-forward structure. In this way, the final multiplication for each estimated term can be reduced to an inner product, with a vector length that is equal to the number of rows of the square Toeplitz matrix. Since the size of each dimension matches the number of coefficients in the polynomial, the number of multiplications performed for each estimate is the same as the specified polynomial order. With this minimal computational complexity, a direct estimate may be made at each clock cycle.

In accordance with some aspects, the frequency estimator provides an accurate estimate of instantaneous frequency, Doppler, and rate of change of Doppler (delta Doppler), based on past observations of phase. For well-behaved changes in Doppler, a reasonable Taylor approximation of phase (as well as frequency and Doppler), may be made about the current sample, using up to the third time derivative such that a linear regression of polynomial order three may be used to provide an estimate in the presence of observation noise.

Figure 8:
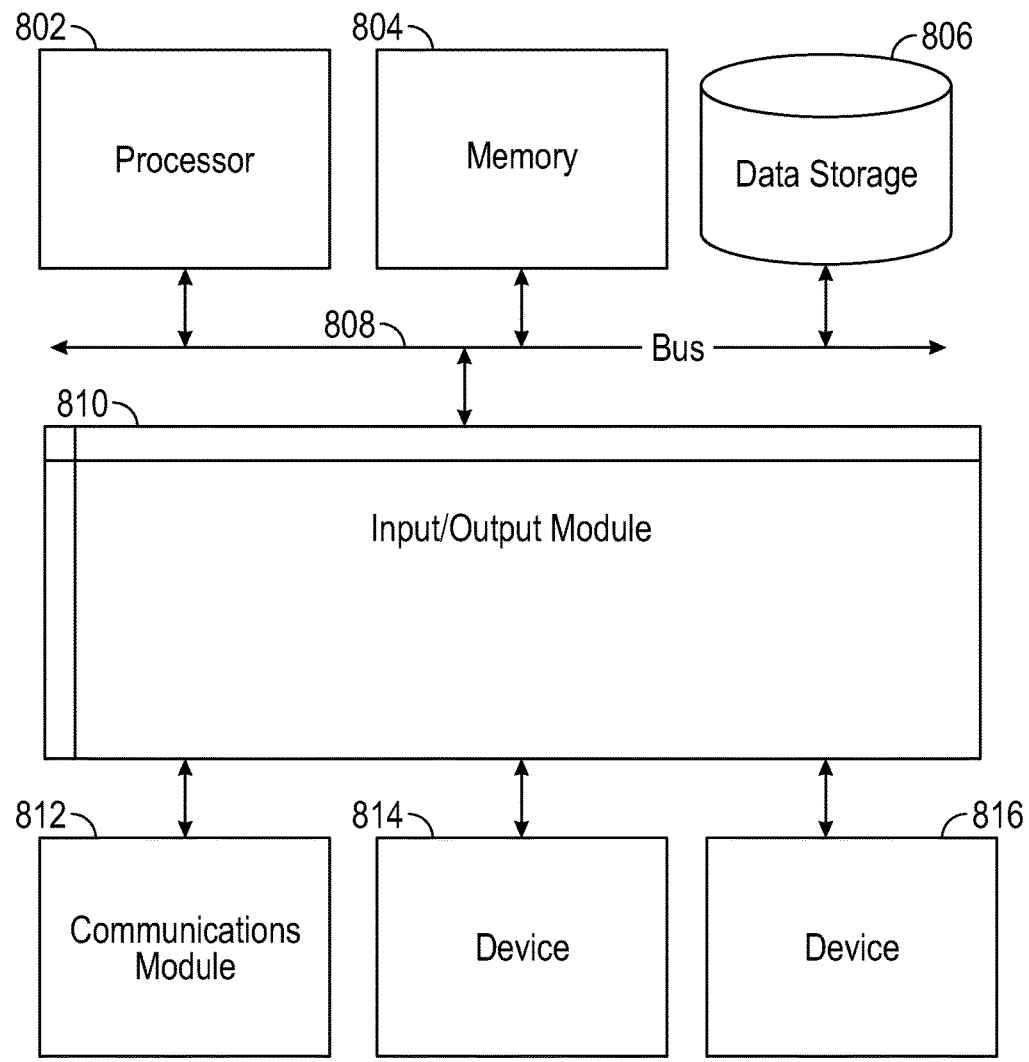
FIG. 8 is a block diagram illustrating an example computer system with which a polynomial estimator or signal estimator can be implemented.

FIG. 8 is a block diagram illustrating an exemplary computer system 800 with which the signal estimator 100 (or a standalone polynomial estimator) of FIG. 1 can be implemented. However, it should also be appreciated that that low memory footprint of the architectures described above in connection with FIGS. 1-7 allows efficient implementation of signal estimator 100 (or a standalone polynomial estimator) entirely in hardware, if desired.

In certain aspects, the computer system 800 may be implemented using hardware or a combination of software and hardware, either in a dedicated server, or integrated into another entity, or distributed across multiple entities.

Computer system 800 (e.g., a computer system having a frequency estimator or a polynomial estimator) includes a bus 808 or other communication mechanism for communicating information, and a processor 802 coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing matrix 114 and/or temporary variables or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 include networking interface cards, such as Ethernet cards and modems. In certain aspects, the input/output module 810 is configured to connect to a plurality of devices, such as an input device and/or an output device 816.

Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as a LCD (liquid crystal display) monitor, for displaying information to the user.

According to one aspect of the present disclosure, signal estimator 100, frequency estimator 104, and/or polynomial estimator 106 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

A reference to an element in the singular is not intended to mean one and only one unless specifically so stated, but rather one or more. For example, a clock signal may refer to one or more clock signals, a control signal may refer to one or more control signals, an input signal may refer to one or more input signals, an output signal may refer to one or more output signals, and a signal may refer to differential voltage signals.

Unless specifically stated otherwise, the term some refers to one or more. Pronouns in the masculine (e.g., his) include the feminine and neuter gender (e.g., her and its) and vice versa. Headings and subheadings, if any, are used for convenience only and do not limit the invention.

The word exemplary is used herein to mean serving as an example or illustration. Any aspect or design described herein as exemplary is not necessarily to be construed as preferred or advantageous over other aspects or designs. In one aspect, various alternative configurations and operations described herein may be considered to be at least equivalent.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

In one aspect, unless otherwise stated, all measurements, values, ratings, positions, magnitudes, sizes, and other specifications that are set forth in this specification, including in the addendum, are approximate, not exact. In one aspect, they are intended to have a reasonable range that is consistent with the functions to which they relate and with what is customary in the art to which they pertain. In one aspect, some of the dimensions are for clarity of presentation and are not to scale.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

A phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one or more aspects, the terms "substantially" and "approximately" may provide an industry-accepted tolerance for their corresponding terms and/or relativity between items. Such an industry-accepted tolerance may range from less than one percent to 20 percent.

Various items may be arranged differently (e.g., arranged in a different order, or partitioned in a different way) all without departing from the scope of the subject technology. In one aspect of the disclosure, the elements recited in the accompanying addendum may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public regardless of whether such disclosure is explicitly recited in claims. No element is to be construed under the provisions of 35 U.S.C. §112, sixth paragraph, unless the element is expressly recited using a phrase means for or, in the case of a method claim, the element is recited using the phrase step for. Furthermore, to the extent that the term include, have, or the like is used, such term is intended to be inclusive in a manner similar to the term comprise as comprise is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the disclosure. In addition, in the Detailed Description, it can be seen that the description provides illustrative examples and the various features are grouped together in various embodiments for the purpose of streamlining the disclosure. This method of disclosure is not to be interpreted as reflecting an intention that the disclosed subject matter requires more features than are expressly recited in claims of any application claiming priority hereto.

What is claimed is:

1. A computer-implemented frequency estimator, comprising:
   a least mean squares (LMS) polynomial estimator configured to receive an electronic input signal, the LMS polynomial estimator comprising:
      a chain of weighted accumulators configured to non-linearly and successively accumulate samples associated with the electronic input signal;
      memory storing a direct estimator matrix that is based on a product of a mapping matrix for the chain of weighted accumulators and a pseudo-inverse of a geometric progression matrix; and
   a matrix multiplier configured to:
      multiply an output vector from the chain of weighted accumulators by the stored direct estimator matrix; and
      generate an estimate of a frequency of the electronic input signal based on the multiplication.

2. The computer-implemented frequency estimator of claim 1, wherein the samples associated with the electronic input signal comprise phase samples, and wherein the polynomial estimator further comprises a delay module and a sample removal module configured to window the phase samples.

3. The computer-implemented frequency estimator of claim 2, further comprising a phase normalization module and a phase differentiation module.

4. The computer-implemented frequency estimator of claim 1, wherein the chain of weighted accumulators comprises a chain of five accumulators and wherein the matrix multiplier is further configured to generate an estimate of a Doppler characteristic and a delta Doppler characteristic of the electronic input signal based on the multiplication.

5. The computer-implemented frequency estimator of claim 4, wherein a first accumulator in the chain of five accumulators is configured to reconstruct an unwrapped phase of the electronic input signal.

6. The computer-implemented frequency estimator of claim 1, wherein the samples associated with the electronic input signal have a common sample period, and wherein the direct estimator matrix is further based on a time-length scale matrix having diagonal entries corresponding to powers of the common sample period, and a length normalization matrix.

7. The computer-implemented frequency estimator of claim 6, wherein the geometric progression matrix is a Vandermonde matrix, and wherein the pseudo-inverse of the geometric progression matrix comprises an inverse of a product of the Vandermonde matrix and a transpose of the Vandermonde matrix.

8. The computer-implemented frequency estimator of claim 1, wherein the mapping matrix maps a physically realizable nonlinear accumulator structure to a theoretical LMS transfer matrix.

9. A computing device, comprising:
a least mean squares (LMS) polynomial estimator, comprising:
a chain of weighted accumulators configured to nonlinearly and successively accumulate samples of an input function;
memory storing a direct estimator matrix that is based on a product of a mapping matrix for the chain of weighted accumulators and a pseudo-inverse of a geometric progression matrix; and
a matrix multiplier configured to:
multiply an output vector from the chain of weighted accumulators by the stored direct estimator matrix; and
generate at least one estimated time derivative of the input function based on the multiplication.

10. The computing device of claim 9, wherein the input function comprises an input function associated with an electronic input signal, and wherein LMS polynomial estimator further comprises a delay module and a sample removal module configured to cooperate to window the samples of the input function.

11. The computing device of claim 10, wherein the windowed samples comprise windowed phase samples.

12. The computing device of claim 9, wherein the chain of weighted accumulators comprises a number of accumulators and wherein the at least one estimated time derivative comprises a number of estimated time derivatives equal to the number of accumulators.

13. The computing device of claim 9, wherein the samples of the input function have a common sample period, and wherein the direct estimator matrix is further based on a time-length scale matrix having diagonal entries corresponding to powers of the common sample period and a length normalization matrix.

14. The computing device of claim 13, wherein the geometric progression matrix is a Vandermonde matrix, and wherein the pseudo-inverse of the geometric progression matrix comprises an inverse of a product of the Vandermonde matrix and a transpose of the Vandermonde matrix.

15. The computing device of claim 9, wherein the mapping matrix maps a physically realizable nonlinear accumulator structure to a theoretical LMS transfer matrix.

16. A computer-implemented method, comprising:
receiving an electronic input signal;
successively accumulating samples associated with the electronic input signal in a chain of weighted accumulators;
storing a direct estimator matrix that is based on a product of a mapping matrix for the chain of weighted accumulators and a pseudo-inverse of a geometric progression matrix;
multiplying an output vector from the chain of weighted accumulators by the stored direct estimator matrix; and
generating an estimate of a frequency of the electronic input signal based on the multiplication.

17. The computer-implemented method of claim 16, further comprising buffering and windowing the samples associated with the electronic input signal.

18. The computer-implemented method of claim 16, further comprising performing a phase unwrapping operation for the electronic input signal.

19. The computer-implemented method of claim 18, further comprising performing a phase reconstruction operation using a first accumulator in the chain of weighted accumulators.

20. The computer-implemented method of claim 16, wherein the pseudo-inverse of the geometric progression matrix comprises an inverse of a product of a Vandermonde matrix and a transpose of the Vandermonde matrix, and wherein the direct estimator matrix is further based on a length normalization matrix and a time-length scale matrix.

* * * * *